United States Patent [19]
Maksutov et al.

[11] 3,729,803
[45] May 1, 1973

[54] PROCESS FOR COATING WITH GLASS THE INTERNAL SURFACE OF METAL PIPES

[76] Inventors: Rafkhat Maksutov, ulitsa Tukaeva, 75, kv. 35; Khalim Akhmetovich Asfandiyarov, ulitsa Tukaeva, 73, kv. 48; Vasily Fedorovich Pashin, ulitsa Neftyanikov, 5, kv. 6; Yakov Fedorovich Gubarev, ulitsa Gogolya, 51, kv. 8; Rifgat Suleimanovich Sadykov, ulitsa Shevchenko, 57, kv. 39; Albert Musagitovich Akhunov, ulitsa Gogolya, 53, kv. 8; Gadel Galyautdinovich Vakhitov, ulitsa Tukaeva, 73, kv. 28; Valery Isaakovich Graifer, ulitsa Parizhskoi Kommuny, 17; Vagiz Murzakhanovich Zyalyaev, ulitsa Gogolya, 51, kv. 5; Gennady Vasilievich Kostrjukov, ulitsa Tukaeva, 53-a, kv. 31, all of Bugulma, U.S.S.R.; Boris Fedorovich Efanov, deceased, late of ulitsa Shevchenko, 53, kv. 35, Bugulma, U.S.S.R. Olga Iosifovna Efanov, administratrix

[22] Filed: Sept. 12, 1969

[21] Appl. No.: 861,217

[52] U.S. Cl. ..................29/421, 29/523, 65/59, 285/55, 29/460
[51] Int. Cl. ..............................B23p 17/00
[58] Field of Search................29/460, 523, 157, 29/421; 65/59; 285/110, 55

[56] References Cited

UNITED STATES PATENTS

| 2,986,847 | 6/1961 | Sato | 65/59 X |
| 3,235,290 | 2/1966 | Young | 65/59 X |
| 3,290,137 | 12/1966 | Tisinai | 65/59 X |

FOREIGN PATENTS OR APPLICATIONS

| 26,473 | 12/1963 | Japan | 65/59 |

Primary Examiner—Charlie T. Moon
Attorney—Waters, Roditi, Schwartz & Nissen

[57] ABSTRACT

A process and installation for coating the internal surfaces of matal pipes with glass including positioning glass bulbs in the pipes and, under pressure, preheating the pipes and glass bulbs, and rotating the pipes to effect a uniform coating of the glass over the internal pipe surfaces.

1 Claim, 8 Drawing Figures

Patented May 1, 1973

Patented May 1, 1973  3,729,803

PROCESS FOR COATING WITH GLASS THE INTERNAL SURFACE OF METAL PIPES

The present invention relates to a process for coating with glass the internal surface of metal pipes, for instance, steel pipes. Moreover, the invention concerns a process for coating the internal surface of metal pipes, providing for placing into the pipes glass bulbs and for the subsequent heating the pipes and bulbs, a gaseous medium at a certain pressure being supplied into the bulbs.

The pipes coated with glass according to this method, are successfully being used in production and handling paraffinic kinds of oil. It is obvious that these pipes may be equally successfully employed for handling aggressive media causing rapid corrosion of metal. Besides, these pipes are capable of preventing damage of foodstuffs, such as, for example, milk.

Known in the prior art are methods for coating with glass the internal surface of metal pipes, envisaging the provision of branch pipes at the both ends of a metallic pipe or blank, and the introducing through one of the branch pipes a glass bulb open at one end. The length of the bulb is selected on the assumption that one end of the bulb be disposed in one branch pipe, whereas the other end thereof, in the second branch pipe. On placing the bulb in the pipe, the latter together with the branch pipes and glass bulb will have to be preheated, and when the glass bulb softens compressed air will have to be supplied through the open end of the bulb. The bulb is thereby expanded, and its walls are pressed to the internal surface of the metal pipe. The glass firmly adheres to the walls of the pipe (Cf.Japanese Patent No. 26,473-38, filed in 1963).

This method produces good results with regard to short pipes. Wherever it is required to coat with glass long tubes, difficulties arise when manufacturing long tubes, transporting, storing and using them on account of their fragility.

Known in the prior art is a method for coating with glass the internal surface of metal pipes, permitting dispensing with the use of the branch pipes. In conformity with this method, a bulb open from one end is to be inserted in the pipe or blank, the end being provided with a flange enabling joining thereto a means for supplying air at a pressure (Cf.Japanese Patent No. 15,371-36, filed in 1961).

When treating long tubes, this method proves to be inadequate for producing favourable results similarly to the above-mentioned one.

Besides, difficulties arise, connected with the joining of the means for supplying air on account of fragility of the bulb flange.

Recently made experiments show that the internal surface of relatively long tubes can be coated with glass without having to vary the length of a heating device, nor increasing the length of the glass bulbs. This was achieved by placing into the pipe or blank relatively short glass bulbs that are fitted one on the other, these glass bulbs being open at one end with the exception of the first one closed at both ends. Then the end of the pipe where this bulb is disposed, is introduced into the heating device and heated there until the end of the bulb is opened under the action of the air expanding therein. Thereafter, compressed air is supplied into the cavity of the opened bulb with a view to joining glass to metal. The pipe is somewhat pushed out from the heating device, and the means for supplying compressed air is joined to the projecting end thereof. Then the pipe is started to be moved through the heating device. When glass has been softened, compressed air makes the opened bulb to be expanded, breaks off its second end, makes the following bulb to expand, breaks off the closed end of the following bulb, etc. (Cf. USSR Author's Certificate No. 172,006, Cl. 32b, 2/05, filed in 1964).

Though this method is capable of providing favourable results with regard to long tubes, it, nevertheless, as well as the preceding ones, suffers from a disadvantage consisting in that the pipe-lines composed of tubes coated with glass according to this method, remain uncoated with glass on the areas of the pipe junctions.

The object of the present invention is to provide such a method for coating with glass the internal surface of metal pipes, which would envisage a continous process for coating a pipe of any length or a pipe string of any length, assembled of these pipes, as well as installations for effecting this method, featuring a relatively high productive capacity.

In accordance with this object, there is proposed a method for coating with glass the internal surface of metal pipes by placing in a pipe glass bulbs and subsequently preheating the pipe and glass bulbs with the supply of a gaseous medium at a pressure into the bulbs. According to the invention, the fore end of each subsequent metal pipe is to be connected with the rear end of the preceding pipe by means of a hermetical joint, for example, by means of a coupling, the glass bulbs being continuously introduced into the pipes from the side of the tubes to be joined, and the latter being moved through the heating device and simultaneously rotated about the longitudinal axis of the pipeline to be assembled in the direction contributing to the screwing together of the pipes. The glass bulbs are open at one end, with the exception of the first bulb which is closed on both ends. The length of the bulbs may not correspond to that of the pipe.

To carry into effect the present method, an installation is proposed, comprising: a means for moving pipes through a heating device, provided in front of the latter; a means for supplying a gaseous means into the bulbs; and also roller tables. The means for moving the pipes is provided with a pair of rollers, in each of which the rollers being made to embrace the pipe from opposite sides, the rollers in each pair being arranged at an angle, which is not equal to the right one, in relation to each other so as to impart the pipe a rotational-and-progressive motion. At this, the walls of the pipes are uniformly heated in the course of moving the pipes through the heating device. It will be obvious that this precludes stresses to be set up in the pipes when they are being coated with glass, and the coating is thus applied more uniformly, and the product of higher quality is thus obtained.

According to the composition of glass to be applied to the pipes, the length of the heating zone and the diameter of the pipes to be treated, the speed of pipes moving through the heating device is to be controlled. This task is accomplished relatively simply. Each guiding roller in a pair is made of two conical parts fitted to each other with their smaller bases and provided on a common bushing so as to permit the shifting of one part in relation to another along the bushing. That is why the areas of contact between the roller and the pipe may be found at different distances from its axis of rotation, which is determined by the distance between the cone-shaped parts. It is obvious that the speed of motion of the pipe directly depends on the value of the said distance.

A substantial advantage of the present invention consists in that it permits the assembling of pipe-lines continuously coated on their internal surface with glass, the method of the invention featuring a relatively high productive capacity.

The present invention also comprises other parts and sub-assemblies, which will be made more fully apparent from a consideration of the following description thereof. The accompanying drawings diagrammatically illustrate, while the description comprehensively states a preferred embodiment of the present invention set forth as an illustrative example.

The description of the accompayning drawings is as follows.

FIGS. 1 to 5 diagrammatically represent the consecutive positioning of a string of pipes to be extended, which are treated according to the proposed method of the present invention;

Figure 1:
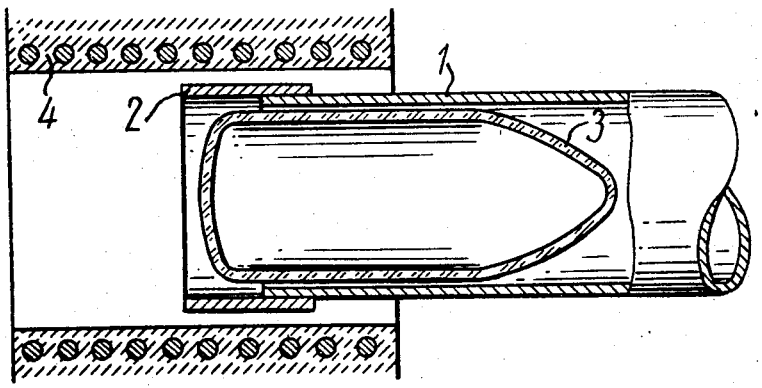
Figure 2:
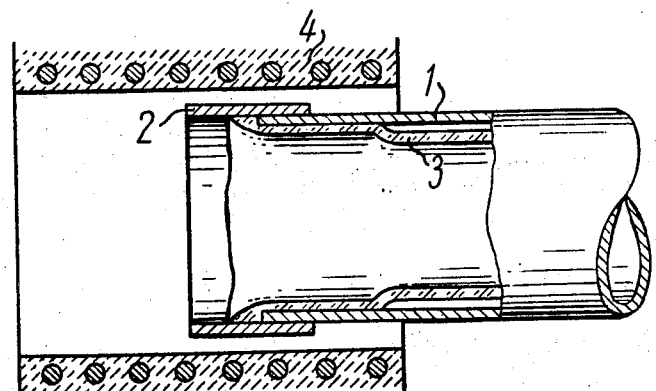
Figure 3:
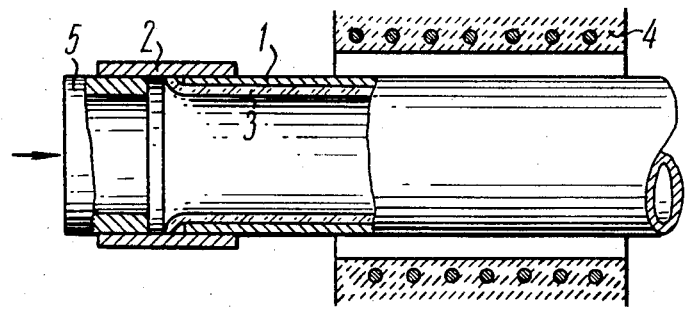
Figure 4:
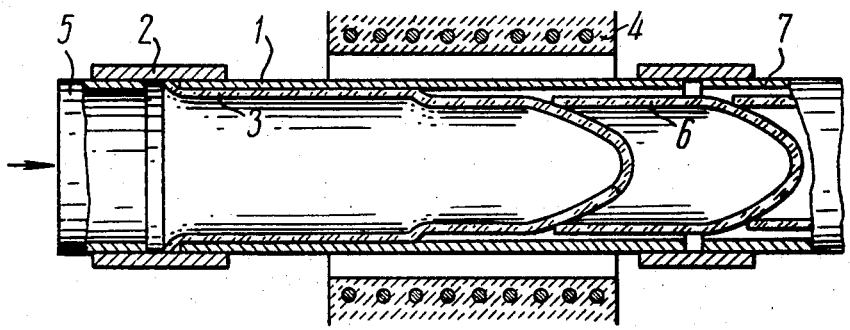

Inserted into a metal pipe or blank 1 (FIG.1) with a coupling 2 screwed on one end thereof, is a glass bulb 3 closed at both ends, the placing is effected in such a manner that its fore end should somewhat protrude from the body of the metal pipe 1. The end of the pipe 1 together with the bulb protruding therefrom are to be placed into an electric heater 4. As the metal pipe 1 and the glass bulb 3 are heated, the gaseous medium contained in the glass bulb 3 expands, while the glass itself is softening at a temperature of 600° to 800°C. The internal pressure of the gaseous medium makes the glass bulb 3 to be expanded and tightly clamped to the inner surface of the metal pipe 1, while its end, protruding from the body of the pipe 1, is opened up, which is exactly shown in FIG.2. The metal pipe 1 is pushed forward until its fore end emerges from the heater, and then connected to this end is a branch pipe 5 (FIG.3) of the known means for supplying the gaseous medium into the glass bulb 3. The branch pipe 5 is connected to the pipe 1 by means of the coupling 2. Pushed into the other end of the metal pipe 1 is the subsequent glass bulb 6 with an open end, which is pushed forward until the rear end of the preceding glass bulb 3 will enter thereinto (FIG.4). The metal pipe 1 containing the glass bulbs is moved through the heater 4 with the aid of a means provided before the latter, the means intended for moving the pipes (the description of its design will be given below) at a speed sufficient for softening up the glass, the pipe being simultaneously rotated about its axis.

Figure 5:
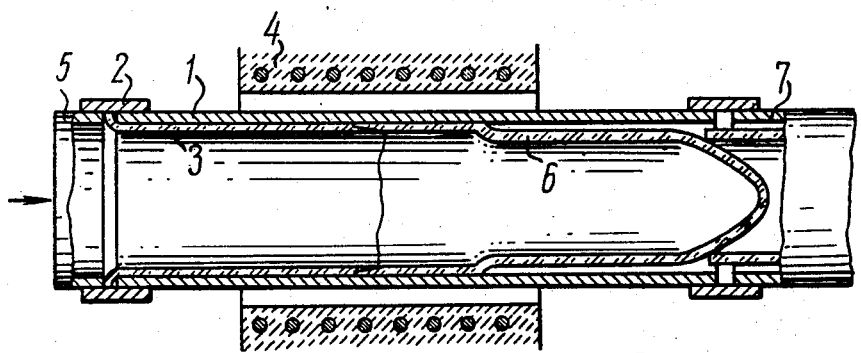

The remaining portion of the glass bulb 3 expanding under the action of the pressure of the gaseous medium being supplied, is tightly clamped to the internal surface of the metal pipe 1, whereas the second soldered up end of the bulb 3, on being swollen and thinned out, it opened up unside the fore end of the subsequent bulb 6, forming therewith a monolithic junction, as it is shown in FIG. 5. The manufacturing process is steadily continued. As the metal pipe 1 together with the glass bulbs pass through the heater 4, the subsequent metal pipes 7 are connected thereto by means of couplings, the pipes being simultaneously filled with glass bulbs, etc. After the metal pipe 1 has emerged from the heater 4, the branch pipe of the means for supplying the gaseous medium is removed therefrom, the pipe 1 is separated from the subsequent pipe 7, the branch pipe 5 of the means for supplying the gaseous medium is connected to the pipe 7, etc. Proceeding in such a manner, the internal surface of the metal pipes is continuously and efficiently coated with glass.

Figure 6:
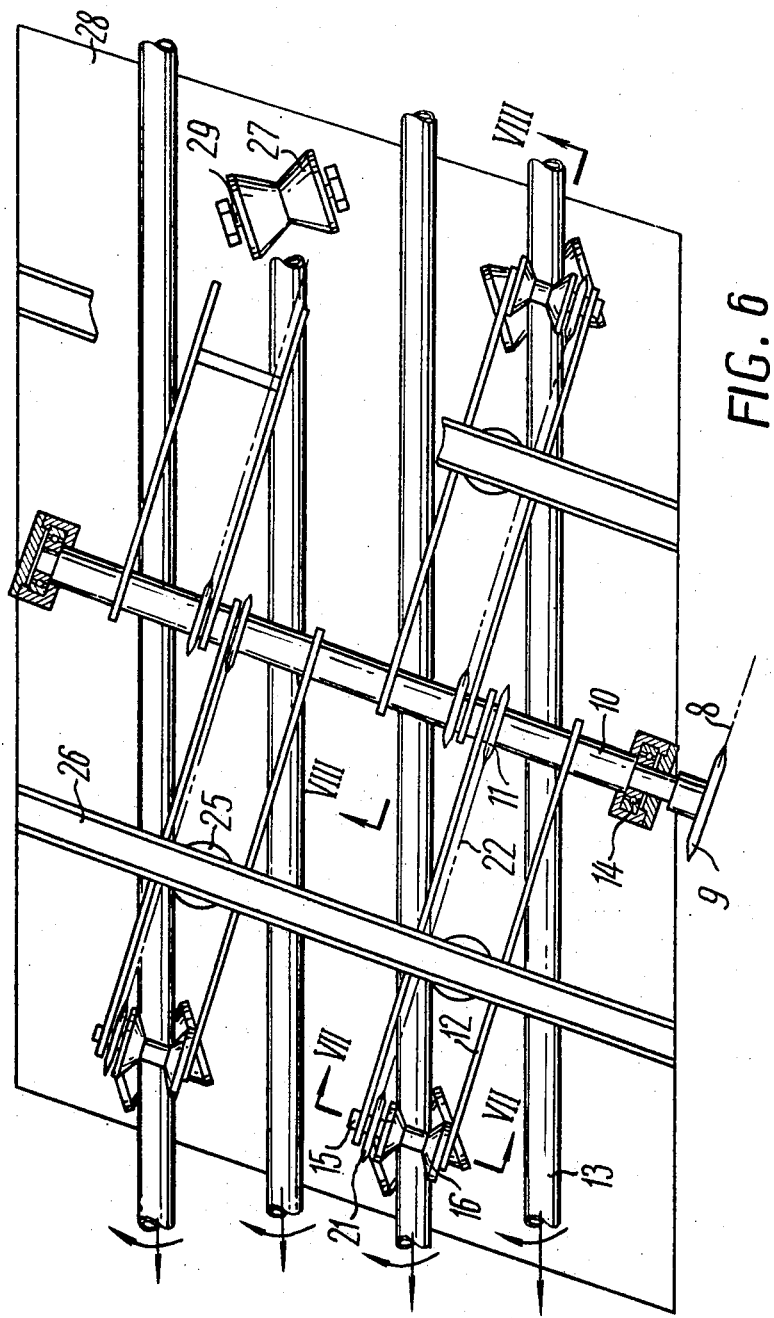
FIG. 6 is a top view of a means intended for moving four strings of pipes through a heating device.

The means for moving the metal pipes through the heating device essentially comprises a chain 8 (FIG.6), a sprocket 9 fixedly mounted on one end of a shaft 10, uniformly arranged on which are intermediate sprockets 11 that are also fixedly mounted, and double or twin levers 12 mounted on the shaft 10 with the provision of some gap. The number of sprockets 11 and double levers 12 corresponds to the number of the strings of pipes 13 to be treated. The shaft 10 is supported by bearings 14, one of which is found near the sprocket 9 on the internal side, whereas the other on the opposite end of the shaft 10, the longitudinal axis of the shaft 10 being disposed at an angle in relation to the direction of motion of the pipes. Mounted on the other end of the double lever 12 by means of a roller 15 is a guide roller 16.

The guide roller 16 (FIG.7) is composed of two cone-shaped parts 17 fitted with their smaller bases one to another and connected by means of a thread joint 19 and a cotter joint 20 to a bushing 18. The guide roller 16 is driven by means of a sprocket 21 which is fixedly secured on the roller 15. The sprocket 21 is connected by means of a chain 22 (FIG.6) to the intermediate sprocket 11.

Figure 8:
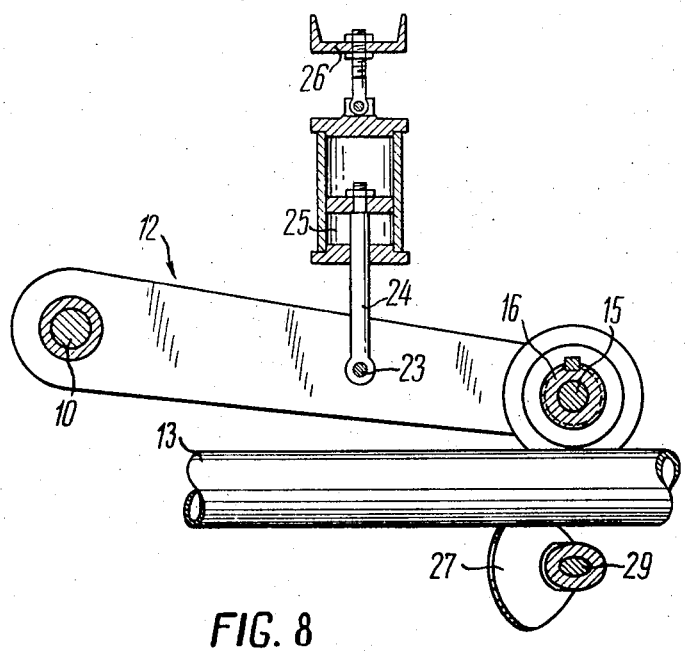
FIG. 8 is a cross-sectional view of same, taken on VIII—VIII line of FIG. 6.

The double lever 12 (FIG.8) is provided with a pin 23 disposed between the shaft 10 and roller 15 nearer to the latter. Articulated to the pin 23 is a rod 24 of a power cylinder 25 which is hingedly suspended on a support 26.

In the course of carrying into effect the manufacturing process, the metal pipes to be coated with glass bear on support rollers 27 (FIG.6) having provided a conical groove for a metal pipe, the support rollers being provided on a stationary bed 28 by means of rollers 29.

The axis of the guide roller 16 is parallel with the axis of the shaft 10 and is arranged at an angle not equal to the right one, in relation to the axis of the pipes being moved, whereas the axis of the support roller 27 is arranged with an opposite inclination to the direction of movement of the pipes, the axes of the support and guide rollers intersecting at an angle not equal to the right one, and are found in planes that are parallel with the plane of motion of the pipes being moved.

Stated below is the description of the operation of the means for moving the metal pipes through the heating device.

The drive of any kind (not shown in the drawings) makes through the chain 8 and the sprocket 9 rotate the shaft 10, simultaneously with which is rotating the intermediate sprocket 11, In the further course, the rotation is transmitted by means of the chain 22 onto the sprocket 21. Thus is rotated the guide roller 16.

After the opening in the heating device 4 of the fore end of the first glass bulb 3 (FIG.2), the metal pipe 1 is pushed forward until its fore end emerges from the heating device 4, and connected to this end is the branch pipe 5 of the means for supplying the gaseous medium inside the glass bulb 3, Thereafter, actuated is a power cylinder 25 (FIG.8) which clamps via the rod 24 through the pin 23 the guide roller 16 to the pipe to be coated with glass, the pipe bearing on the support roller 27. The guide roller 16 moves the pipe or the string 13 with glass bulbs through the heating device 4. Since the axes of the guide and support rollers are arranged at an angle not equal to the right one, in relation to the direction of movement of the pipe, the latter is additionally rotated about its axis.

Figure 7:
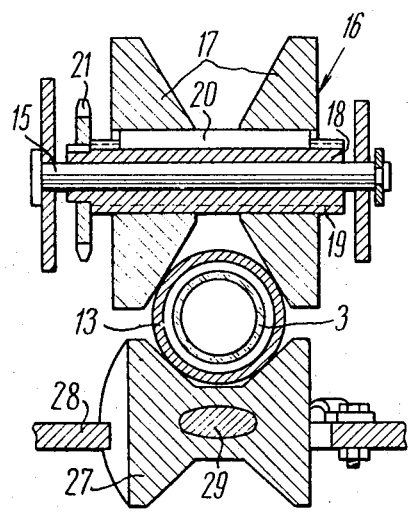
FIG. 7 is a cross-sectional view of same, taken on VII—VII line of FIG. 6.

The speed of motion of the metal pipes may be varied by changing over the sprocket 9 or by varying the distance between the cone-shaped parts of the guide roller 16 (FIG. 7). The latter method is suitable in the case where the strings are to be treated, composed of pipes of different diameters.

To move the pipes or the strings of pipes towards the heating device and therefrom recourse is had to roller tables (that are not shown in the drawing).

The uniform motion of the pipes through the heating device and their simultaneous rotation about their axes with the excess pressure being maintained within a range from 0.8 to 1.0 atms ensure the good coating with glass of the internal surface of metal pipes throughout their length.

What we claim is:

1. A process for coating the internal surface of long metal pipes with glass comprising the steps of: introducing a glass bulb having both ends sealed into a pipe through a front end portion thereof, the length of the bulb being considerably smaller than the length of the pipe; positioning the pipe into a heating means; heating said pipe until the sealed front end of the glass bulb opens and expands against the pipe wall forming a glass blank having a sealed rear end; supplying compressed gas into the front end of said bulb while imparting a simultaneous continuous uniform longitudinal forward displacement of the pipe; rotating said pipe about its longitudinal axis as it passes through said heating means; introducing at least one tubular glass blank sealed at one end into the rear end of said pipe with the open end of the blank extending forward so that the sealed rear end of a previously inserted blank enters into said open end of said blank; attaching a coupling to the rear end of said pipe; subsequently connecting a successive pipe to said pipe coupling; and sequentially filling said pipes and coupling with said open-ended glass blanks while moving said pipes and coupling through said heating means so as to continuously coat the internal surfaces of said pipes and coupling.

* * * * *